(12) United States Patent
Kasemsadeh

(10) Patent No.: US 11,340,064 B2
(45) Date of Patent: May 24, 2022

(54) TILT SWITCH BASED ON DIFFERENTIAL SENSING

(71) Applicant: TEXAS INSTRUMENTS INCORPORATED, Dallas, TX (US)

(72) Inventor: Benjamin Soheyl Kasemsadeh, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 162 days.

(21) Appl. No.: 15/950,139

(22) Filed: Apr. 10, 2018

(65) Prior Publication Data

US 2019/0017821 A1    Jan. 17, 2019

Related U.S. Application Data

(60) Provisional application No. 62/483,826, filed on Apr. 10, 2017.

(51) Int. Cl.
*G01C 9/06* (2006.01)
*G01C 9/10* (2006.01)

(52) U.S. Cl.
CPC ................ *G01C 9/06* (2013.01); *G01C 9/10* (2013.01)

(58) Field of Classification Search
CPC ........ G01C 2009/064; G01C 2009/102; G01C 2009/107; G01C 9/10
See application file for complete search history.

(56) References Cited

U.S. PATENT DOCUMENTS

| | | | | |
|---|---|---|---|---|
| 3,164,997 A * | 1/1965 | Aske | .......................... | G01P 7/00 73/503 |
| 4,365,513 A * | 12/1982 | Iwasaki | ................... | G01P 15/11 336/30 |
| 4,821,423 A * | 4/1989 | Adams | .................. | G01P 15/032 324/207.18 |
| 4,843,877 A * | 7/1989 | Kushida | ................... | G01P 15/11 73/514.08 |
| 4,922,753 A * | 5/1990 | Idogaki | .................... | G01P 15/08 73/514.08 |
| 5,042,158 A * | 8/1991 | Schmelzer | ............... | G01C 9/10 33/366.18 |

(Continued)

FOREIGN PATENT DOCUMENTS

JP          2012028035 A * 2/2012

*Primary Examiner* — Walter L Lindsay, Jr.
*Assistant Examiner* — Milton Gonzalez
(74) *Attorney, Agent, or Firm* — Ray A. King; Charles A. Brill; Frank D. Cimino

(57) ABSTRACT

A tilt switch based on differential threshold sensing includes a tilt track (such as a tilt tube), and a tilt/target element moveable along the tilt track by gravity between first/second ends based on tilt angle. An inductive sensor includes first/second sense coils at the ends of the tilt track, and sensor circuitry (a) to drive each sense coil to project a magnetic sensing field, and to measure a differential sensor to a position of the tilt/target element relative to the sense coils, based on a property corresponding to sense coil inductance (for example, relative to a pre-defined switching threshold position), and (b) to provide, in response to the differential sensor response, a tilt switch output corresponding to a tilt angle of the tilt track based on a position of the tilt/target element relative to the sense coils (or switching threshold), for example, with a pre-defined hysteresis.

15 Claims, 4 Drawing Sheets

(56) References Cited

U.S. PATENT DOCUMENTS

| | | | | | |
|---|---|---|---|---|---|
| 5,452,520 | A | * | 9/1995 | Raj | G01C 9/10 |
| | | | | | 33/365 |
| 5,552,703 | A | * | 9/1996 | Hore | G01C 9/06 |
| | | | | | 324/207.22 |
| 5,941,904 | A | * | 8/1999 | Johnston | A61N 1/056 |
| | | | | | 607/19 |
| 6,062,081 | A | * | 5/2000 | Schendel | G01P 15/105 |
| | | | | | 73/514.08 |
| 6,148,669 | A | * | 11/2000 | Roest | G01P 15/11 |
| | | | | | 33/366.25 |
| 6,472,864 | B1 | * | 10/2002 | Emo | G01C 9/06 |
| | | | | | 200/61.45 R |
| 6,978,569 | B2 | * | 12/2005 | Williamson, IV | F41G 1/44 |
| | | | | | 42/132 |
| 2017/0059735 | A1 | * | 3/2017 | Reitsma | G01D 5/22 |

\* cited by examiner

TILT SWITCH BASED ON DIFFERENTIAL SENSING

CROSS-REFERENCE TO RELATED APPLICATIONS

Priority is claimed under 37 CFR 1.78 and 35 USC 119(e) to U.S. Provisional Application 62/483,826, filed 2017 Apr. 10, which is incorporated by reference.

BACKGROUND

Inductive/capacitive sensing can be based on a driven inductive/capacitive sensor that projects a time-varying magnetic/electric sensing field within a defined sensing area. Sensor response to a proximate target element (i.e., a target/element within the sensing area) can be used to detect/measure proximity/position of the target element.

In the case of inductive sensing, a driven sense inductor coil projects a time-varying magnetic sensing field into a defined sensing area. The magnetic sensing field induces eddy current loops in a proximate conductive target, resulting in an eddy-current back emf (electromotive force) voltage in the sense inductor coil, opposing the sensor-projected magnetic sensing field, and eddy-current energy losses (resistive due to the induced eddy current loops in the target.

Eddy current sensing can be based on changes in mutual inductance between the sense inductor coil, and the induced target eddy current loops, resulting from the induced back emf/voltage, and/or changes in sensor impedance resulting from the resistive energy loss in the induced target eddy current loops. Changes in mutual inductance reflecting back emf can be measured/detected based on, for example, changes in sensor inductance, or changes in a sensor property corresponding to inductance. Changes in sensor impedance reflecting resistive energy loss can be measured/detected based on, for example, changes in the signals that drive the sensor to project the sensing field.

Inductive sensing can be based on a resonant sensor in which an LC resonator is driven at resonance, i.e., a resonant frequency/amplitude for steady-state oscillation. For inductive resonant sensing, a sense inductor is coupled to a resonator capacitor, and the LC resonator is driven at resonance to project the magnetic sensing field. A resonant sensor can also be configured for capacitive resonant sensing using a sense capacitor (electrode) and a resonator inductor, the LC resonator driven at resonance to project an electric sensing field. Resonant sensing is based on changes in resonance state caused by a sensed condition, such as target proximity or position.

For inductive resonant sensing, changes in mutual inductance between the sense inductor and the target eddy current loops, based on back emf and/or changes in sensor impedance, can be sensed as changes in resonant state of the driven sensor resonator. Changes in mutual inductance can be measured/detected based on, for example, changes in sensor inductance as represented by a change in sensor resonator frequency. Changes in energy loss in the target can be measured/detected based on, for example, changes in sensor resonator loss factor as reflected in the drive signals required to maintain resonance.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for a tilt switch based on differential threshold sensing.

According to aspects of the Disclosure, a tilt switch for sensing a tilt condition can include a tilt track with first and second ends, and a tilt/target element moveable along the tilt track by gravity between the first and second ends based on a tilt angle of the tilt track (for example, a tilt tube). An inductive sensor can include first and second sense coils, respectively located at the first and second ends of the tilt track, and sensor circuitry coupled to the first and second sense coils. The sensor circuitry can be configured to drive each sense coil to project a respective time-varying magnetic sensing field at a respective first and second end of the tilt track, and to measure a differential sensor response associated with the first and second sense coils to a position of the tilt/target element relative to the first and second sense coils, based on a property corresponding to inductance of each sense coil (for example, relative to a pre-defined switching threshold position). The sensor circuitry can be further configured to provide, in response to the differential sensor response from the first and second sense coils, a tilt switch output (for example, with a pre-defined hysteresis) corresponding to a tilt angle of the tilt track based on a position of the tilt/target element relative to the first and second sense coils.

Other aspects and features of the invention claimed in this Patent Document will be apparent to those skilled in the art from the following Disclosure.

BRIEF DESCRIPTION OF THE DRAWINGS

FIG. 3A illustrates Coil Inductance (L) versus Target Position, corresponding to the position of a tilt ball within a tilt tube, relative to the sense coils [Coil1/Coil2], which establish a switching threshold [$L_{TH}$], including Coil1/Coil 2 inductance readout L1/L2 [341, 342] with hysteresis (for example, $L_2$+0.4%, $L_2$−0.4%), for threshold switch positions [SW1/SW2]; and FIG. 3B illustrates IDC (sensor electronics) switch output [SW1, SW2], corresponding to the position of the tilt ball within the tilt tube, relative to a switching threshold (with hysteresis).

FIG. 3B, SW1/SW2].

DETAILED DESCRIPTION

Figure 1A:
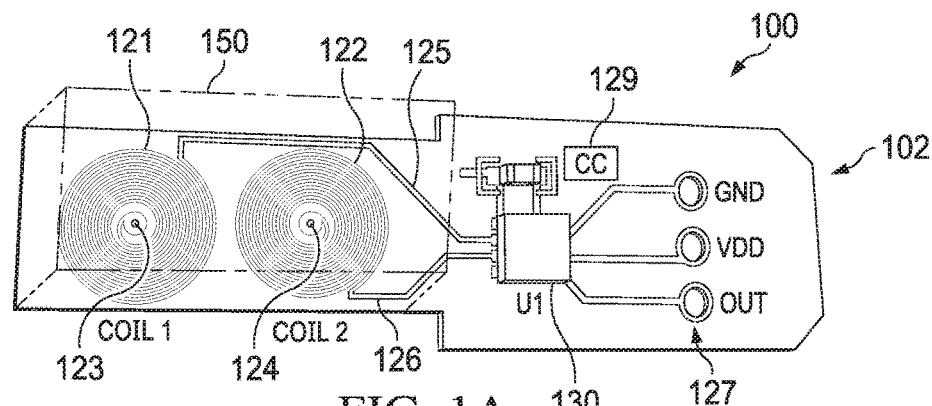
FIGS. 1A-1D illustrate an example tilt switch [100] based on inductive differential threshold sensing, including a tilt sensor assembly (PCBA) [102] and a tilt/target structure [150/155]: (a) the tilt sensor assembly including co-planar differential sense inductor coils Coil 1 and Coil 2 [121/122] formed (printed) on the PCBA [102] and trace coupled [125/126] to a sensor electronics IC [130], and (b) the tilt/target structure including an example tilt tube [150] mounted over the sense coils, to contain a conductive tilt ball [155] constrained by the tilt tube to roll by gravity, based on a tilt angle of the tilt tube, between Position 1 (Coil 1) and Position 2 (Coil 2).

This Description and the Drawings constitute a Disclosure for a tilt switch based on differential threshold sensing, including describing design examples (example implementations), and illustrating various technical features and advantages.

This Disclosure uses the following nomenclature: "differential threshold sensing" means sensing with dual sensors (inductive or capacitive) driven to project time-varying sensing fields within respective first and second sensing areas, to detect movement of a target element (tilt/target) between the first/second sensing areas (sensing positions), based on a relative response of the sensors to target position, including sensing target position relative to a switching threshold position established by the differential sensors; "tilt/target structure" means any mechanical structure in which a tilt/target element is moveable along/within a tilt track by gravity based on tilt angle of the tilt track, such as a tilt ball that rolls within a tilt tube based on tilt angle, between first/second sensing positions defined by the differential sensors with respective sensing areas encompassing the first/second sensing positions of the tilt track, including movement relative to a switching threshold position established by the differential sensors; "tilt/target" means any conductive target element, such as a conductive tilt ball, configured for movement along a tilt track by gravity based on tilt angle of the tilt track, such as a tilt ball that rolls within a tilt tube based on tilt angle between first and second sensing positions (sensing areas); and "sensor electronics" means any electronics designed to drive dual sensors (inductive or capacitive) at first/second positions of a tilt tube, to project respective time-varying sensing fields into respective sensing areas encompassing the first/second sensing positions of the tilt tube, and to measure relative sensor response to a tilt/target (such as a tilt ball) that moves by gravity based on tilt angle of the tilt tube relative to a switching threshold established by the differential sensors.

Design examples (example implementations) are described for a tilt switch based on inductive differential threshold sensing with differential sense inductor coils Coil1/Coil2 at respective ends of a tilt tube in which a tilt ball is constrained to roll by gravity based on tilt angle. Example sensor electronics implemented as an inductance-to-data converter (IDC), drives the sense coils Coil1/Coil2 to project respective time-varying magnetic sensing fields into sensing areas encompassing Position1/Position2 ends of the tilt tube, using eddy current sensing to detect movement of a tilt/target (such as a tilt ball) based on tilt angle, between the Position1/Position2 sensing areas (i.e., between the differential sense coils Coil1/Coil2, relative to a switching threshold). In one design example, inductive differential threshold sensing can be based on resonant inductive sensing with dual sensor resonators implemented with differential sense inductor coils, and a resonator capacitor (shared), driven at resonance to project respective time-varying magnetic sensing fields into Position1/Position2 sensing areas. The principles of the Disclosure can also be used for a tilt switch based on capacitive differential threshold sensing, with differential capacitive electrodes driven to project respective electric sensing fields.

FIGS. 1A-1D illustrate an example tilt switch 100 based on inductive differential threshold sensing 100, implemented as a PCBA (printed circuit board assembly) 102. PCBA 102 includes differential planar (printed) inductor coils 121/122 (Coil1/Coil2), trace coupled to sensor electronics 130, implemented as an example inductance-to-data converter (IDC) integrated circuit (IC). Sensor electronics IC 130 is trace coupled to connector terminals 127.

FIGS. 1A-1D illustrate an example tilt switch 100 based on inductive differential threshold sensing, including a tilt sensor assembly 102, implemented as a PCBA (printed circuit board assembly), and an example tilt/target structure, represented by a tilt tube 150 and tilt ball 155. Tilt sensor assembly 102 includes co-planar differential sense inductor coils 121/122 (Coil1/Coil2) formed (printed) on the PCBA, and trace coupled 125/126 to a sensor electronics integrated circuit (IC) 130. The tilt/target structure includes a tilt tube that extends between a Position 1 proximate Coil 1 and a Position 2 proximate Coil 2, constraining the tilt ball to roll between Position1/Position2 at Coil1/Coil2.

Tilt switch 100 detects/signals the position of tilt ball 155 along the tilt tube 150 based on differential threshold sensing, in which the differential sense coils 121/122 (Coil1/Coil2) are driven by sensor electronics 130 to project time-varying sensing fields within respective first/second sensing areas at the Position1/Position2 ends of the tilt tube of the tilt/target structure (represented by tilt tube 150 and tilt ball 155). Movement of the tilt ball 155 between the first/second sensing areas (Position1/Position2 of the tilt tube 150) is detected based on a relative response of the sense coils Coil1/Coil2 (such as a change in sense coil inductance) to tilt ball position, corresponding to sensing a position of the target ball relative to a switching threshold established by the differential sense coils (and sensor electronics IC 130).

Referring to FIG. 1A, the example sensor arrangement includes co-planar sense coils 121, 122 (Coil1/Coil2), which are coupled to the sensor electronics IC 130 through traces 125, 126. Sensor electronics 130 is implemented as an example inductance-to-data converter (IDC), described in connection with FIG. 4. Sensor electronics IC 130 is trace coupled to connector terminals 127.

Figure 1B:
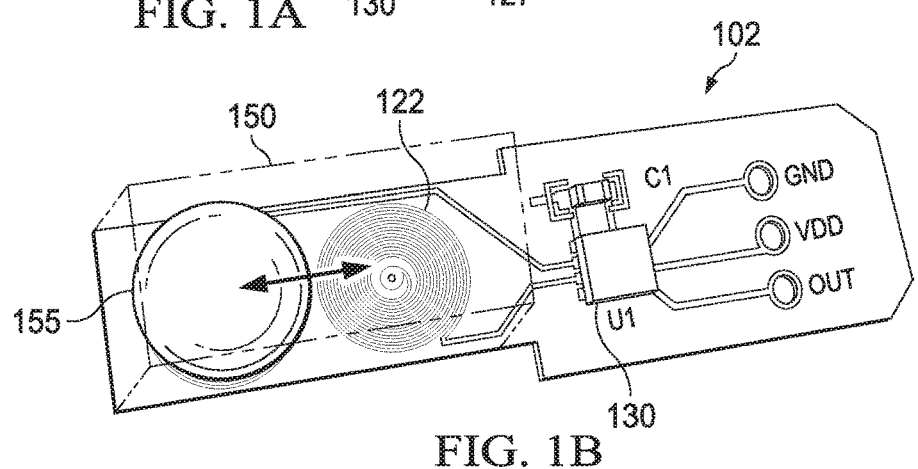
Figure 1C:
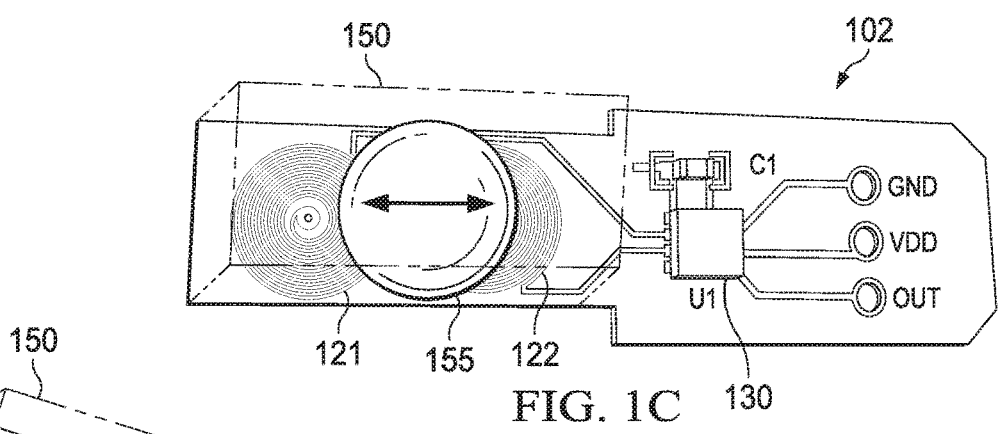
Figure 1D:
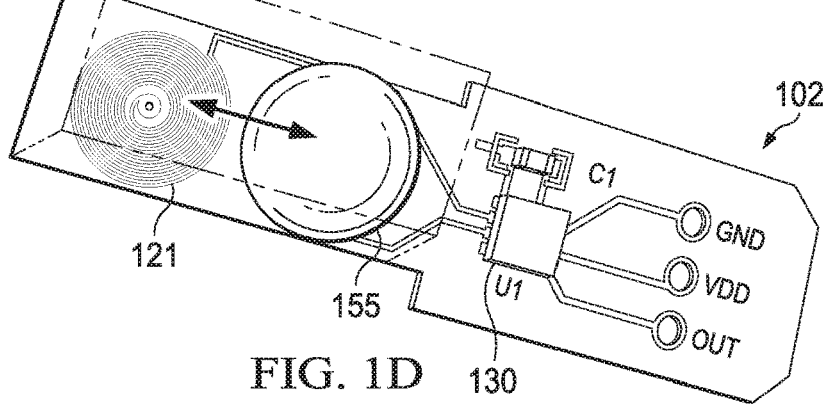

Referring to FIGS. 1B-1D, the tilt/target structure represented by tilt tube 150 is disposed over (adjacent to) the inductor coils 121, 122. Tilt tube 150 contains a conductive tilt ball 155 constrained by the tilt tube to roll by gravity, based on a tilt angle of the tilt tube, between Position 1 of the tilt tube proximate Coil 1 and Position 2 of the tilt tube proximate Coil 2. Sensor electronics IC 130 and the differential sense Coil1/Coil2 establish a switching threshold for movement within the tilt tube between Position1/Position2 (Coil1/Coil2).

FIG. 1B illustrates tilt tube 150 at an example negative tilt angle relative to horizontal, so that tilt ball 155 rolls by gravity to Position 1, proximate (over) Coil 1 (121). In FIG. 1D, the tilt angle of tilt tube 150 is changed to an example positive tilt angle relative to horizontal, so that tilt ball 155 rolls by gravity to Position 2, proximate (over) Coil 2 (122).

FIG. 1C illustrates the tilt ball 155 at a position between Coil 1 and Coil 2, representing a change in tilt angle.

For the example sensor assembly 102, Coil 1 (121) is wound (printed) clockwise to a via 123, and Coil 2 (122) is oppositely wound (printed) counterclockwise to a via 124. Vias 123, 124 can be used to connect sense coils 121/122 on the front-side of PCBA 102, through to respective back-side return traces, or to respective back-side sense coils. Back-side sense coils can be cooperatively wound in the same direction as the associated front-side sense coil, so that the magnetic sensing fields projected from front/back-side sense coils are additive.

To reduce coupling between the sense coils, the co-planar sense coils 121/122 can be oppositely wound, for example, Coil 1 wound clockwise, and co-planar Coil 2 wound counterclockwise. In addition, shielding, such as ferrite or metal shielding, including driven shielding, can be used to shield the sense coils from moving conductive elements that are not the intended tilt/target. In addition, while the example sense coils of FIGS. 1A-1D are illustrated as being of the same size, the sense coils can be of different sizes (such as for controlling the switching threshold between Position1/Position2).

Sensor electronics IC 130 drives the differential sense inductor coils 121/122 (Coil1/Coil2) to project time-varying sensing fields into sensing areas encompassing Position 1 and Position 2 at ends of the tilt tube 150 proximate Coil 1 and Coil 2. Sensor electronics IC 130 detects/measures relative sensor response to a tilt ball that moves based on tilt angle of the tilt tube 150, relative to a switching threshold position between Position1/Coil1 and Position2/Coil2 as established by the differential sensor response.

That is, sensor electronics 130 determines the position of the tilt ball 155 within the tilt tube 150 by comparing the inductance (or a property related to inductance) of the sense inductor coils 121/122 (Coil1/Coil2). Sensor electronics 130 provides a tilt switch output based on measured relative inductance between the sense coils based on the position of the tilt ball tilt/target relative to the sense coils, i.e., relative to the switching threshold established by the sensor electronics based on differential sensor response. As described in connection with FIG. 4, an example tilt switch is based on resonant inductive sensing with dual sensor resonators formed by differential sense coils, and a common resonator capacitor.

Figure 2A:
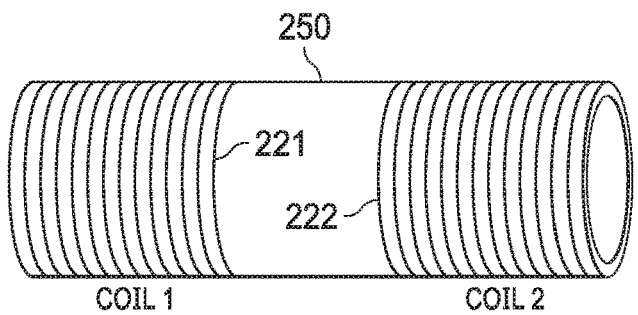
FIGS. 2A-2D illustrate an example tilt switch based on inductive differential threshold sensing in which Coil 1 and Coil 2 [221, 222] are wound around respective ends of a cylindrical tilt tube [250], containing a conductive tilt ball [255], constrained to roll by gravity, based on a tilt angle of the tilt tube, between Coil 1 (Position 1) and Coil 2 (Position 2).
Figure 2B:
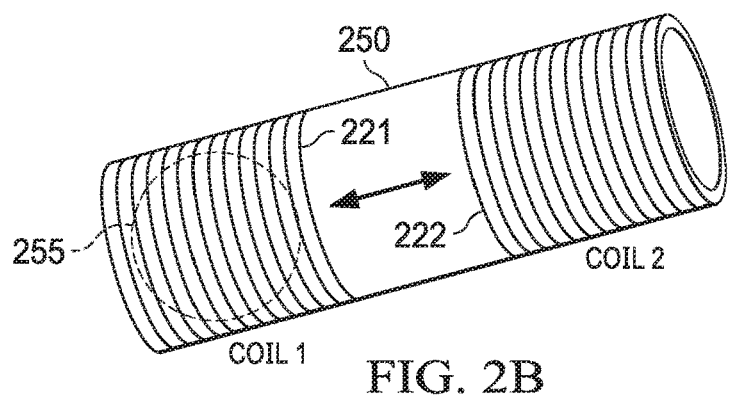
Figure 2C:
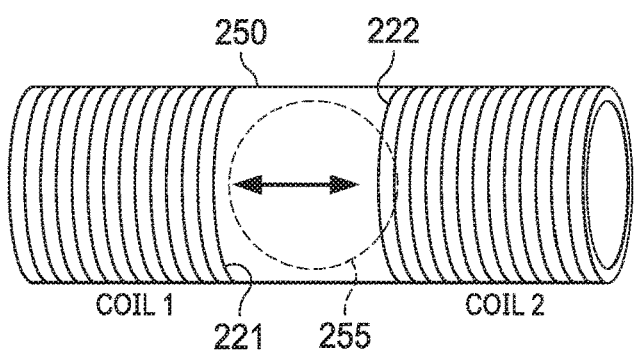
Figure 2D:
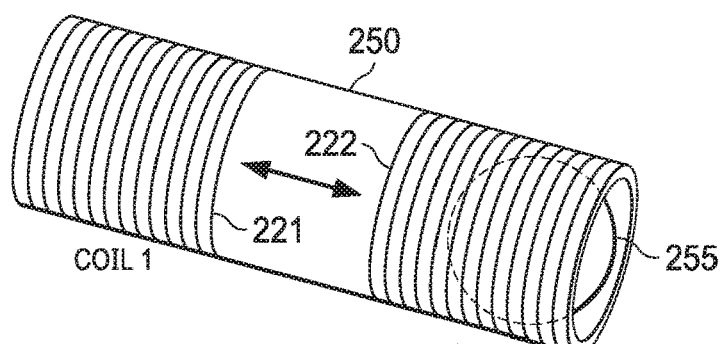

FIGS. 2A-2D illustrate an alternate example inductive sensing based tilt switch, in which Coils 1 and 2 221, 222 are wound around respective ends of a tilt tube 250. Referring to FIGS. 2B-2D, tilt tube 250 contains a conductive tilt ball 255, which is constrained to roll by gravity, based on a tilt angle of the tilt tube, between: (FIG. 2B) Coil 1 at Position 1, and (FIG. 2D) Coil 2 at Position 2, with (FIG. 2C) illustrating the tilt ball at a switching threshold.

Figure 3A:
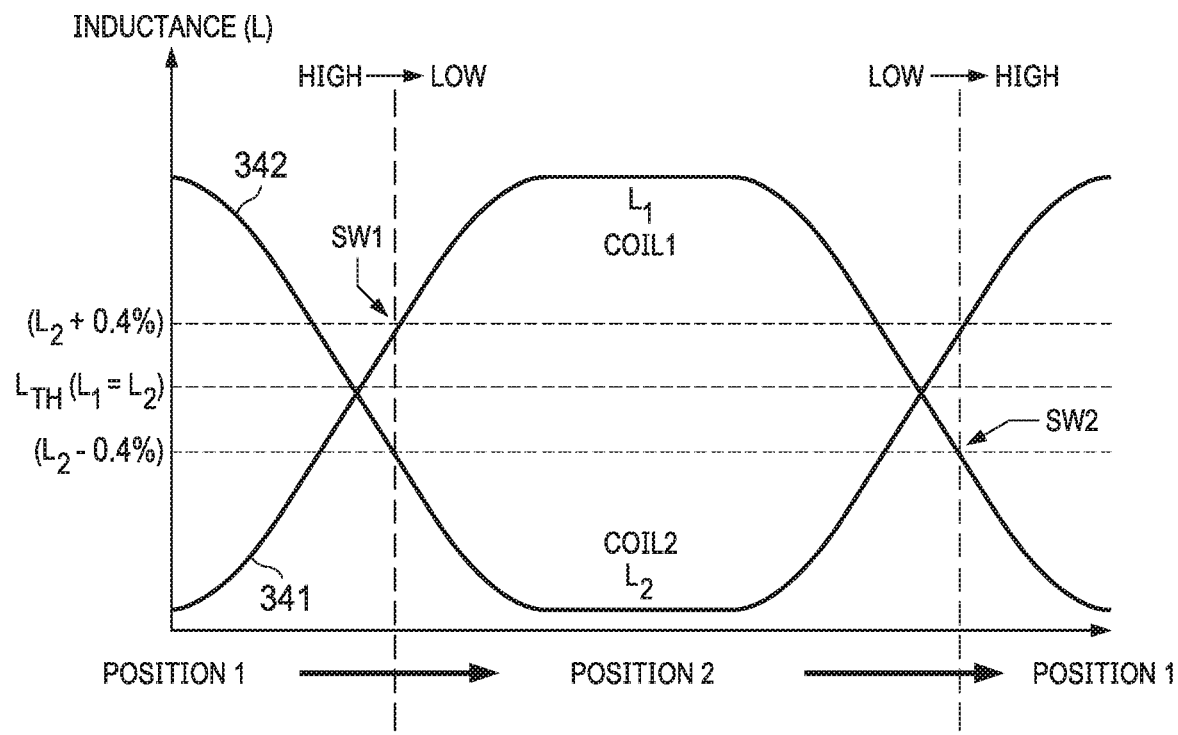
FIGS. 3A-3B illustrate example waveforms for a tilt switch based on inductive differential threshold sensing according to this Disclosure.
Figure 3B:
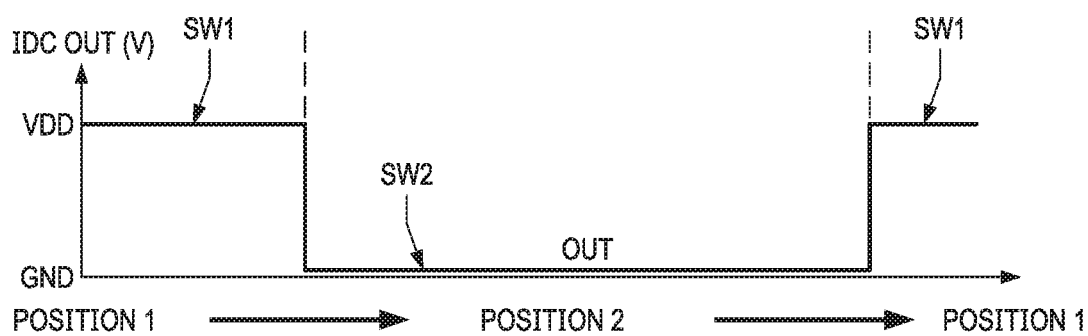

FIGS. 3A-3B illustrate example waveforms for an inductive sensing based tilt switch according to this Disclosure, including illustrating inductive switch output based on a relative inductance of differential sense inductor coils (FIG. 1/2, Coil1/Coil2), corresponding to the tilt position of the tilt ball within the associated sensing area of the Coil1/Coil2 inductors positioned at one end or the other of the tilt tube based on tilt angle.

FIGS. 3A-3B illustrate example waveforms for a tilt switch based on inductive differential threshold sensing according to this Disclosure, including illustrating inductive switch output based on a relative inductance of the differential matching sense inductor coils Coil 1 and Coil 2, corresponding to the tilt position of the tilt ball within the tilt tube (FIG. 1, 150/155)) within the associated sensing area of the sense Coil1/Coil2, respectively Position1/Position2 of the tilt tube.

FIG. 3A illustrates relative Coil Inductance (L) versus Target Position, corresponding to the tilt position of tilt ball between Position 1 and Position 2 of the tilt tube based on tilt angle. As illustrated, the tilt/target (such as a tilt ball) is at Position 1 proximate Coil 1, such that L1/Coil1 inductance readout 341 is low, and L2/Coil2 inductance readout 342 is high. When the tilt ball moves from Position 1 proximate Coil 1 to Position 2 proximate Coil 2 (based on a change in the tilt angle of the tilt tube), the L1/Coil1 inductance readout 341 transitions low-to-high, through switch point SW1 (for example, $L_2$+0.4%, with hysteresis, as discussed below), and the L2/Coil2 inductance readout 342 transitions high-to-low. When tilt ball moves back from Position 2 proximate Coil 2 to Position 1 proximate Coil 1 (based on a change in tilt angle of the tilt tube), the L1/Coil1 inductance readout 341 transitions high-to-low, through switch point SW2 (for example, $L_2$−0.4%, with hysteresis, as discussed below), and the L2/Coil2 inductance readout 342 transitions low-to-high.

That is, for the differential, matching sense inductor coils (Coil1/Coil2): (a) if the tilt ball is within the sensing area of Coil 1 at Position 1 (i.e., covering a greater area of Coil 1 than Coil 2), then the L1/Coil1 inductance is less than the L2/Coil2 inductance; or (b) if the tilt ball is within the sensing area of Coil 2 at Position 2 (i.e., covering a greater area of Coil 2 than Coil 1), then the L1/Coil1 inductance is higher than the L2/Coil2 inductance. Based on the relative inductance of the Coil1/Coil2 inductors, as determined by the sensor electronics measurement of response of the driven sense coils to the tilt ball within the tilt tube (relative to the sense coils), the inductive tilt switch output SW1/SW2 from the sensor electronics switches to indicate tilt position of the tilt ball within the tilt tube, relative to sense Coil 1 and sense Coil 2 at Position 1 and Position 2 of the tilt tube.

For the example tilt switch based on inductive differential threshold sensing, the sensor electronics switches with hysteresis. For the example in FIG. 3A, hysteresis is set relative to Coil 2, so that a transition of the tilt ball from Position 1 to Position 2 of the tilt tube is signaled when the L1/Coil 1 inductance 341 rises above the L2/Coil2 inductance by at least 0.4%, corresponding to switch point SW1. Similarly, a transition of the tilt ball from Position 2 to Position 1 of the tilt tube is signaled when the L1/Coil 1 inductance 341 falls below the L2/Coil2 inductance by at least 0.4%, corresponding to switch point SW2. That is, if the tilt ball is positioned within the tilt tube to cover a substantially equal area of Coil 1 and Coil 2, the inductance of both Coils is substantially equal, and a state of the inductive switch output is determined by hysteresis.

Figure 4:
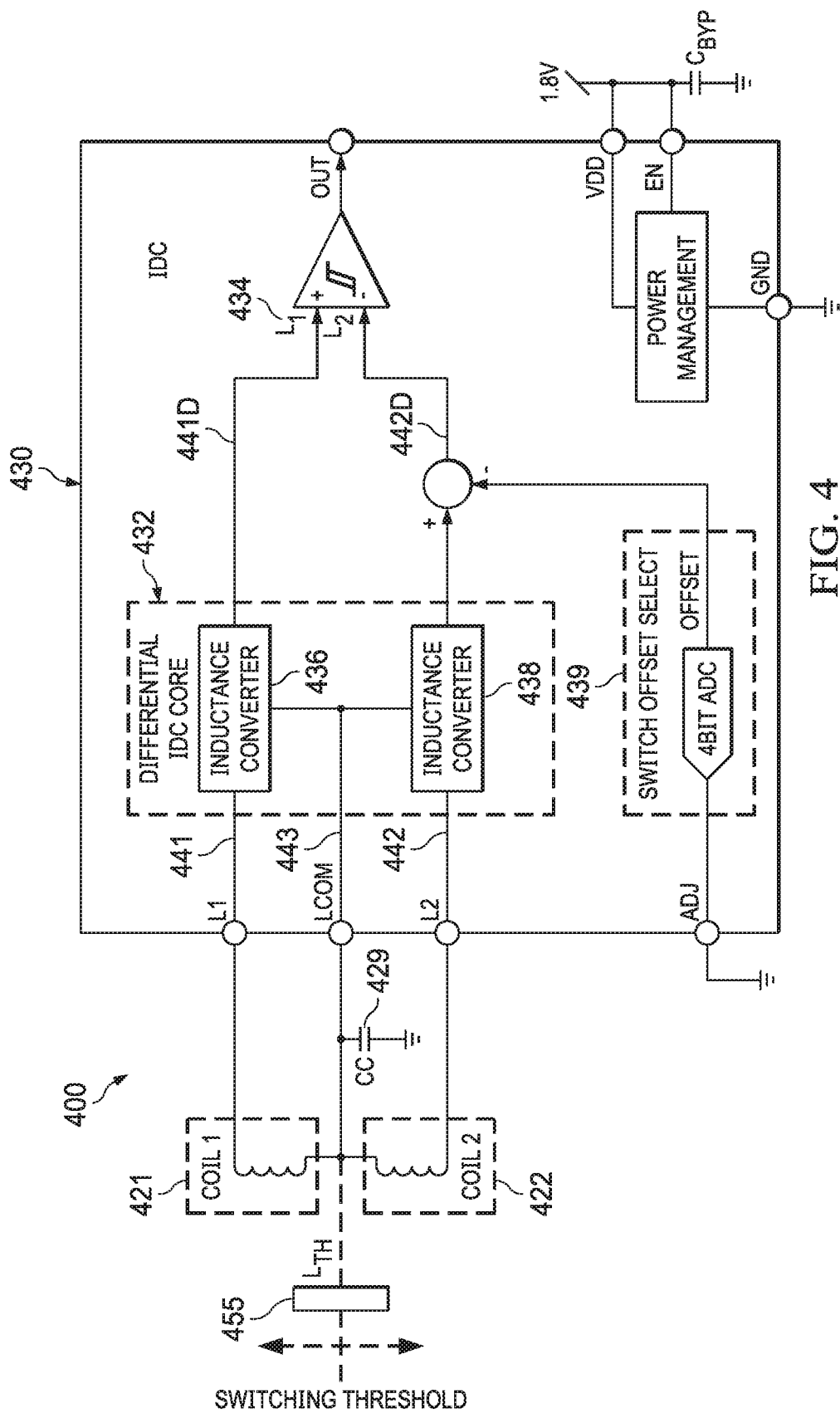
FIG. 4 illustrates an example tilt switch [400] based on inductive differential threshold sensing according to this Disclosure, implemented based on resonant inductive sensing with example dual differential sensor resonators [421/429, 422/429] with a shared resonator capacitor [429], and example sensor electronics, implemented as an example inductance-to-data converter (IDC) [430], including a differential IDC core [432, 436/438], and an inductance (hysteretic) comparator [434], the IDC core converting differential sensor response measurements [terminals L1/L2 and LCOM] into sensor response data for input to the inductance comparator, which provides a tilt switch output [OUT] corresponding to tilt switch position [FIG. 2, Position1/Position2.

FIG. 4 illustrates an example tilt switch 400 based on inductive differential threshold sensing according to this Disclosure, implemented based on resonant inductive sensing. Tilt switch 400 includes example differential sensor resonators Coil1/CC and Coil2/CC, and an example inductance-to-data converter (IDC) 430.

Dual sensor resonators are formed by Coil1 421 and Coil2 422, with a common, shared resonator capacitor CC 429, forming the sensor resonators Coil1/CC and Coil2/CC. IDC 430 includes sensor terminals L1, L2 and LCOM. Coil 1 is coupled between terminals L1 and LCOM, and Coil 2 is coupled between terminals L2 and LCOM. The resonator capacitor CC 429 is coupled to the LCOM terminal.

The example tilt/target structure is represented by target element 455 that moves (such as a tilt ball that moves by gravity based on tilt angle as described above) relative to a switching threshold $L_{TH}$, between co-planar sense Coil 1 and sense Coil 2, which establish Position 1 and Position 2 at either end of the example tilt tube.

IDC 430 includes a differential IDC core 432, and an inductance (hysteretic) comparator 434. IDC core 432 includes dual channel inductance converters 436 and 438 ($L_1$ and $L_2$). The example IDC 430 also includes a switch offset select circuit 439.

Inductance converter 436 is coupled 441/443 through terminals L1/LCOM to sensor resonator Coil1/CC (421/429), providing resonator drive signals, and acquiring sensor response measurements from the sensor resonator Coil1/CC. Inductance converter 438 is coupled 442/443 through terminals L2/LCOM to sensor resonator Coil2/CC (422/429), providing resonator drive signals, and acquiring sensor response measurements from the sensor resonator Coil2/CC. The dual sensor resonators Coil1/CC and Coil2/CC are differentially driven and measured by the respective Inductance converters 436/438.

The IDC core 432 (inductance converters 436/438) converts differential sensor response measurements 441/442, from the dual sensor resonators Coil1/CC (L1/LCOM) and Coil2/CC (L2/LCOM), to sensor response data 441D and 442D. For the example IDC 430, the sensor response measurements correspond to inductances $L_1/L_2$ for Coil1/Coil2. Coil inductance measurements $L_1/L_2$ are input to the inductance (hysteretic) comparator 434.

Inductance comparator 434 provides a tilt switch output OUT corresponding to the position of a tilt/target (such as a tilt ball 155 in FIG. 1B-1D) relative to the switching threshold position established by IDC 430 and the differential sensor response from sense coils Coil1/Coil2. IDC OUT corresponds to the position of the tilt/target 455 based on tilt angle, such as a tilt ball within a tilt tube as described above, relative to the pre-defined switching threshold position.

Referring also to FIG. 3B, the tilt switch outputs from IDC 430, $L_1/L_2$. inductance comparator are SW1 and SW2. Referring also to FIG. 3A, the switch points SW1 and SW2 are determined by the hysteresis of the hysteretic inductance comparator 434. From above, IDC 430 establishes an inductance switching threshold $L_{TH}$, and IDC OUT signals SW1 when $L_1$ rises above $L_2$ by at least 0.4%, and signals SW2 when $L_1$ decreases below $L_2$ by at least 0.4%.

The example IDC 430 provides an optional adjustment to the inductance switching threshold $L_{TH}$ with the switch offset select circuit 439. The switch offset select circuit includes a ADC that converts an adjustment code to an offset value combined with the $L_2$ output of inductance converter 438 for input to the $L_1/L_2$ inductance comparator 434 (shifting the $L_{TH}$ switching threshold, such as for coils of different sizes, or to move the $L_{TH}$ switching point relative to the differential sensor response from sense coils Coil1/Coil2, such as for adjusting tilt switching angle/threshold for a tilt switch mounted at an angle).

A tilt switch based on differential threshold sensing according to this Disclosure can be used to sense tilt for safety reasons, or to provide a switched input to control system features such as automotive lighting, vending machines, fall alarms. Output switching/signaling is based on a detecting a position of a tilt/target (such as a tilt ball) within/along a tilt tube based on tilt angle, relative to a tilt switching threshold, including implementing tilt switching with hysteresis. Inductive sensing is immune to DC magnetic fields (tamper proof), can provide high reliability (no electrical contact required), and can provide stable performance across temperature. Placing the tilt switch in a metal housing provides immunity to interfering metal on the outside of the housing. The tilt tube can be mounted in the system at an angle (using switching threshold offset to adjust the tilt-angle switching threshold). An inductive sensing based tilt switch with differential sense inductor coils according to this Disclosure can replace tilt switches with mechanical, magnetic (hall-effect or reed), and chemical (mercury) actuation.

The Disclosure provided by this Description and the Figures sets forth example embodiments and applications illustrating aspects and features of the invention, and does not limit the scope of the invention, which is defined by the claims. Known circuits, connections, functions and operations are not described in detail to avoid obscuring the principles and features of the invention. These example embodiments and applications, including example design considerations, can be used by ordinarily skilled artisans as a basis for modifications, substitutions and alternatives to construct other embodiments, including adaptations for other applications.

The invention claimed is:
1. A tilt switch for sensing a tilt condition, comprising:
a tilt track with first and second ends, the tilt track having a threshold position between the first and second ends;
a target element moveable along the tilt track between the first and second ends responsive to a tilt angle of the tilt track;
a first sense coil located at the first end and wound in a clockwise direction, having first and second coil terminals;
a second sense coil located at the second end and wound in a counter-clockwise direction, having third and fourth coil terminals;
a common coil terminal coupled to the second and third coil terminals;
a first inductance-to-data converter (IDC) having a first IDC terminal coupled to the first coil terminal, a second IDC terminal coupled to the common coil terminal, and a first IDC output terminal;
a second IDC having a third IDC terminal coupled to the fourth coil terminal, a fourth IDC terminal coupled to the common coil terminal, and a second IDC output terminal;
an adjustment code terminal configured to receive a switching threshold adjustment code;
an analog-to-digital converter (ADC) having a first ADC input coupled to the adjustment code terminal, and an ADC output terminal providing a digitized version of the adjustment code;
a summing circuit having a first input coupled to the second IDC output terminal, a second input coupled to the ADC output terminal, and a summing circuit output;
an amplifier having a first amplifier input coupled to the first IDC output terminal, a second amplifier input coupled to the summing circuit output, and an amplifier output;
wherein, the first and second IDCs are configured to drive the first and second sense coils, respectively, to generate respective first and second time-varying magnetic sensing fields, and to measure first and second inductance responses of the first and second sense coils, respectively;
the amplifier output providing, in response to the first and second inductance responses, a tilt switch output cor- responding to a tilt angle of the tilt track indicating a position of the target element relative to the threshold position.

2. The tilt switch of claim 1, wherein the amplifier provides the tilt switch output with a pre-defined hysteresis.

3. The tilt switch of claim 1, wherein:
the tilt track includes a tilt tube; and
the target element includes a tilt ball constrained to roll within the tilt tube, between the first and second ends of the tilt tube based on the tilt angle.

4. The tilt switch of claim 3, wherein the first and second sense coils are one of:
first and second planar sense coils formed on a printed circuit board disposed adjacent the tilt tube with the first and second planar sense coils respectively at the first and second ends of the tilt tube; and
first and second wound sense coils wound around respective first and second ends of the tilt tube.

5. The tilt switch of claim 1, including a tilt switch assemblage having:
a tilt sensor printed circuit board (PCB) assembly that includes:
the first and second sense coils formed on the PCB;
the first and second IDCs;
the ADC, summing circuit and amplifier; and
a tilt/target structure including:
the tilt track; and
the target element;
wherein the tilt sensor PCB assembly and the tilt/target structure are cooperatively arranged to form the tilt switch assemblage.

6. The tilt switch of claim 1, wherein the first and second IDCs include respective first and second resonant inductive sensors including first and second sensor resonators, respectively, including the first and second sense coils located at the first and second ends of the tilt track.

7. A tilt sensor assembly for use in a system including:
a tilt track with first and second ends, the tilt track having a threshold position between the first and second ends;
a target element moveable along the tilt track between the first and second ends responsive to a tilt angle of the tilt track;
a tilt sensor printed circuit board (PCB) assembly, including:
first and second sense coils formed on the PCB, wherein the first sense coil has first and second coil terminals and is wound in a clockwise direction, and the second sense coil has third and fourth coil terminals and is wound in a counter-clockwise direction;
sensor circuitry coupled to the first and second sensor coils;
the first and second sense coils disposed at first and second positions of the tilt sensor PCB assembly corresponding respectively to an associated position of the first and second ends of the tilt track;
the sensor circuitry including:
a common coil terminal coupled to the second and third coil terminals;
a first inductance-to-data converter (IDC) having a first IDC terminal coupled to the first coil terminal, a second IDC terminal coupled to the common coil terminal, and a first IDC output terminal;
a second IDC having a third IDC terminal coupled to the fourth coil terminal, a fourth IDC terminal coupled to the common coil terminal, and a second IDC output terminal;

an adjustment code terminal configured to receive a switching threshold adjustment code;
an analog-to-digital converter (ADC) having a first ADC input coupled to the adjustment code terminal, and an ADC output terminal providing a digitized version of the adjustment code;
a summing circuit having a first input coupled to the second IDC output terminal, a second input coupled to the ADC output terminal, and a summing circuit output;
an amplifier with hysteresis having a first amplifier input coupled to the first IDC output terminal, a second amplifier input coupled to the summing circuit output, and an amplifier output;
the amplifier output providing a tilt switch output corresponding to a tilt angle of the tilt track responsive to a position of the target element relative to the threshold position.

8. The assembly of claim 7, wherein the amplifier provides the tilt switch output with a pre-defined hysteresis.

9. The assembly of claim 7, wherein
the tilt track includes a tilt tube, and the target element includes a tilt ball, the tilt ball constrained to roll by gravity between the first and second ends of the tilt tube based on a tilt angle; and
the first and second sense coils are one of:
first and second planar sense coils formed on a printed circuit board disposed adjacent the tilt tube with the first and second planar sense coils respectively at the first and second ends of the tilt tube; and
first and second wound sense coils wound around respective first and second ends of the tilt tube.

10. The assembly of claim 7, wherein
the tilt sensor PCB assembly includes first and second sensor resonators respectively including the first and second sense coils, and including a resonator capacitor coupled to the first and second sense coils to form the first and second sensor resonators;
the sensor circuitry coupled to the first and second sensor resonators,
to drive each sensor resonator from the respective sense coil, providing a respective time-varying magnetic sensing field, and
to measure a differential sensor resonance response responsive to the first and second sensor resonators.

11. The assembly of claim 10, wherein:
the first IDC drives the first sensor resonator, and measures a first resonance response of the first sensor resonator responsive to a position of the target element relative to the first sense coil, and converts the measured first resonance response to first inductance data corresponding to an inductance of the first sense coil, and
the second IDS drives the second sensor resonator, and measures a second resonance response of the second sensor resonator responsive to a position of the target element relative to the second sense coil, and converts the measured second resonance response into second inductance data corresponding to an inductance of the second sense coil.

12. An inductive sensor circuit for use in a system having a tilt/target structure including a tilt track with first and second ends, the tilt track having a threshold position between the first and second ends, and a target element moveable along the tilt track by gravity between the first and second ends based on a tilt angle of the tilt track, the system comprising:

a first sense coil located at the first end and wound in a clockwise direction, having first and second coil terminals;

a second sense coil located at the second end and wound in a counter-clockwise direction, having third and fourth coil terminals;

a common coil terminal coupled to the second and third coil terminals;

a first inductance-to-data converter (IDC) having a first IDC terminal coupled to the first coil terminal, a second IDC terminal coupled to the common coil terminal, and a first IDC output terminal;

a second IDC having a third IDC terminal coupled to the fourth coil terminal, a fourth IDC terminal coupled to the common coil terminal, and a second IDC output terminal;

an adjustment code terminal configured to receive a switching threshold adjustment code;

an analog-to-digital converter (ADC) having a first ADC input coupled to the adjustment code terminal, and an ADC output terminal providing a digitized version of the adjustment code;

a summing circuit having a first input coupled to the second IDC output terminal, a second input coupled to the ADC output terminal, and a summing circuit output;

an amplifier having a first amplifier input coupled to the first IDC output terminal, a second amplifier input coupled to the summing circuit output, and an amplifier output;

wherein, the first and second IDCs are configured to drive the first and second sense coils, respectively, to generate respective first and second time-varying magnetic sensing fields, and to measure first and second inductance responses of the first and second sense coils, respectively; and the amplifier output provides, responsive to the first and second inductance responses, a tilt switch output corresponding to a tilt angle of the tilt track indicative of a position of the target element relative to the threshold position.

13. The circuit assembly of claim 12, wherein the amplifier provides the tilt switch output with a pre-defined hysteresis.

14. The circuit of claim 12, wherein the system includes first and second sensor resonators respectively including the first and second sense coils, and including a resonator capacitor coupled to the first and second sense coils to form the first and second sensor resonators, and wherein:

the sensor circuitry coupled to the first and second sensor resonators to drive each sensor resonator from the respective sense coil, providing a respective time-varying magnetic sensing field, and to measure a differential sensor resonance response responsive to the first and second sensor resonators.

15. The circuit of claim 14, wherein the sensor circuitry comprises an inductance-to-data converter (IDC) circuit, including:

the first IDC drives the first sensor resonator, and measures a first resonance response of the first sensor resonator responsive to a position of the target element relative to the first sense coil, and converts the measured first resonance response to first inductance data corresponding to an inductance of the first sense coil, and the second IDS drives the second sensor resonator, and measures a second resonance response of the second sensor resonator responsive to a position of the target element relative to the second sense coil, and converts the measured second resonance response into second inductance data corresponding to an inductance of the second sense coil.

* * * * *